United States Patent [19]
Frankel

[11] Patent Number: 5,339,387
[45] Date of Patent: Aug. 16, 1994

[54] PLANAR COLOR GRADIENTS CONSTRUCTED AS AN ARBITRARY FUNCTION OF A DISTANCE FUNCTION FROM AN ARBITRARY 2-D CURVILINEAR FUNCTION

[75] Inventor: Carl B. Frankel, San Francisco, Calif.

[73] Assignee: Abekas Video Systems, Inc., Redwood City, Calif.

[21] Appl. No.: 783,633

[22] Filed: Oct. 24, 1991

[51] Int. Cl.$^5$ ............................................ G06F 15/00
[52] U.S. Cl. .................................................. 395/131
[58] Field of Search ............... 395/131, 133, 134, 162; 340/701, 703; 358/81, 82, 76, 78; 345/22, 23

[56] References Cited

U.S. PATENT DOCUMENTS 4,232,311  11/1980  Agneta ................................ 340/703
4,559,531  12/1985  Buynak ............................... 340/703
5,241,461  8/1993   Georges .............................. 364/148

Primary Examiner—Phu K. Nguyen
Attorney, Agent, or Firm—Limbach & Limbach

[57] ABSTRACT

An apparatus and method for electronically generating colorized characters for display by an external video display device wherein a user can specify one or more characters to be displayed, one or more curves, and one or more colorization functions which specify the colors of a pixel of the character to be displayed at a distance defined by a distance function. The apparatus reads the character defining data for the character to be displayed and generates and outputs electronic colorization data for each pixel of the character by electronically calculating the colorization function as a function of the distance defined by the distance function for the specified curve or curves.

8 Claims, 9 Drawing Sheets

AS PLACED      AS ACTUALLY GRADED

PLANAR COLOR GRADIENTS CONSTRUCTED AS AN ARBITRARY FUNCTION OF A DISTANCE FUNCTION FROM AN ARBITRARY 2-D CURVILINEAR FUNCTION

TECHNICAL FIELD

This invention relates to video character generation and more particularly to generation of colored video characters.

BACKGROUND ART

There is known a video character generator which is able to place a color gradient across the surface of the generated and displayed characters. In the prior art this gradient is always parallel or perpendicular to the raster scan lines, and makes a linear transition from one color to another across the entire surface of the character. Every rectangular region, whether a character, word, line or page, has the same start and the same end colors. The color of each pixel on the surface of the character is given by:

$$\chi_{(x,y)} = \chi_{start} + ((y-a) \times \chi_\Delta) \qquad (1)$$

The appearance of this type of gradient on a display is shown in FIG. 1 and its inflexibilities highlighted in FIG. 2. Greater freedom in positioning the generated characters and coloring them is necessary.

SUMMARY OF THE INVENTION

The above problems are overcome by the present invention of an apparatus, and the method embodied in its operation, for electronically generating colorized characters for display by an external video display device, comprising first memory means for storing character defining data;

input means for allowing a user to specify one or more characters to be displayed, one or more curves, and one or more colorization functions which specify the colors of a pixel of the character to be displayed at the distance defined by the distance function; and processing means for reading the character defining data for the character to be displayed and for generating and outputting electronic colorization data for each pixel of the character by electronically calculating the colorization function as a function of the distance function from the specified curve or curves.

It is an object of the apparatus and method of the present invention to allow the user the unprecedented flexibility of five degrees of freedom in coloring the characters which may be displayed.

It is another object of the apparatus and method of the present invention to provide a relatively inexpensive way to produce elaborate special coloring effects for the characters of a video display.

Yet a further object of the apparatus and method of the present invention is to provide a way relatively quickly to generate elaborately colored characters for a video display at a speed suitable for interactive operation.

The foregoing and other objectives, features and advantages of the invention will be more readily understood upon consideration of the following detailed description of certain preferred embodiments of the invention, taken in conjunction with the accompanying drawings.

BEST MODE FOR CARRYING OUT THE INVENTION

Figure 1:
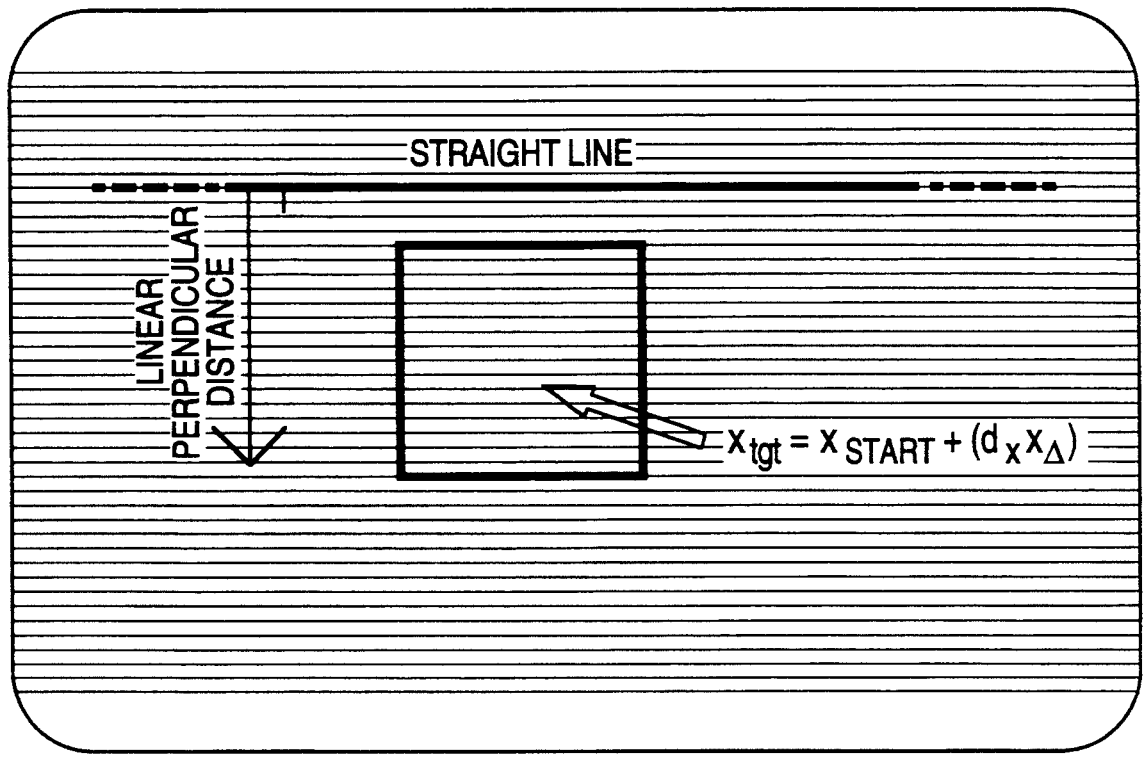
FIGS. 1 and 2 are illustrations for use in describing the mode by which a prior art colored character generator displays the generated characters.
Figure 2:
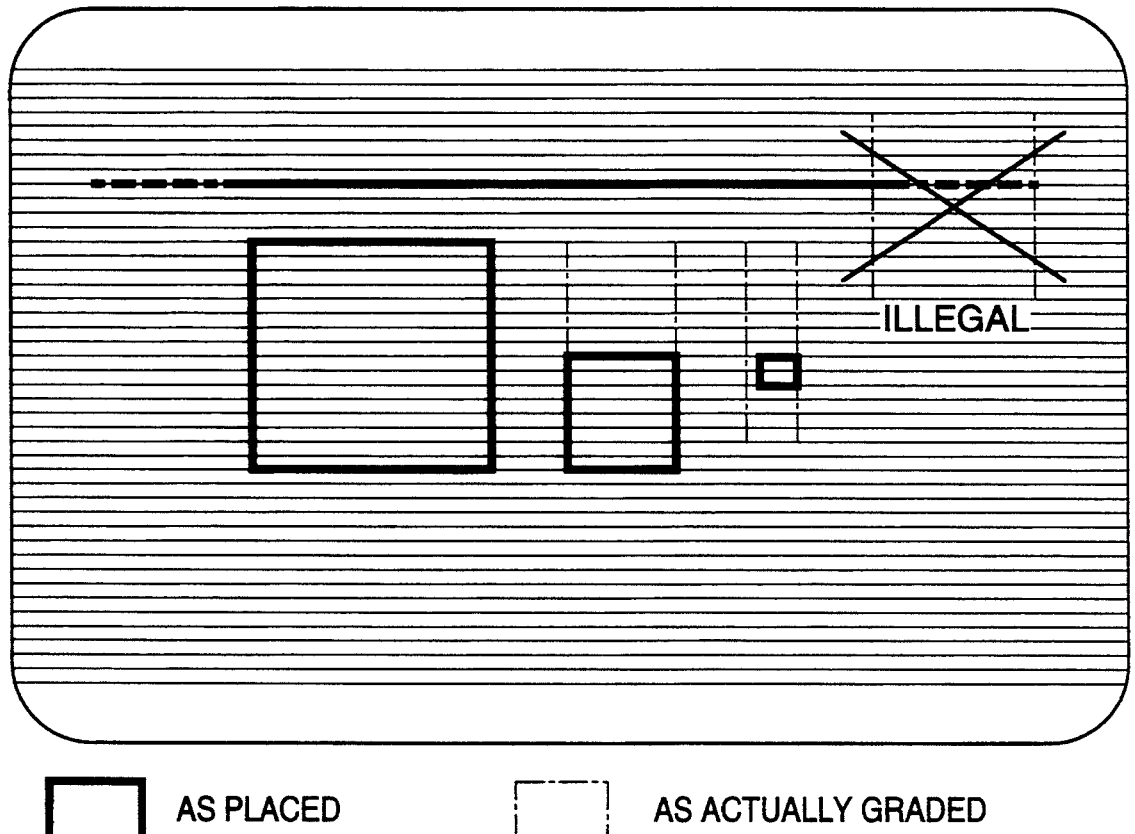
Figure 2:
Figure 2:
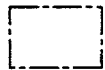
Figure 3:
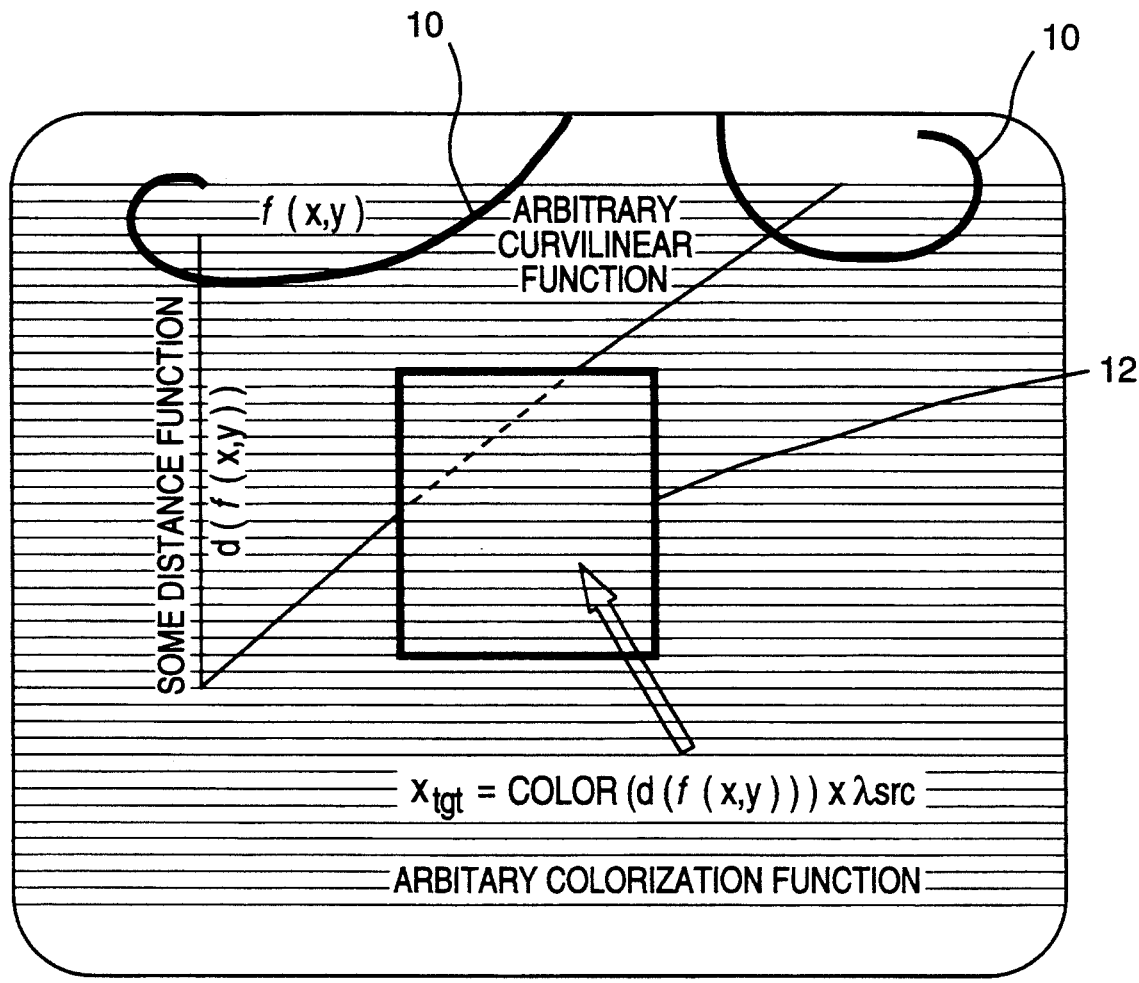
FIGS. 3 and 4 are illustrations for use in describing the effect of the present invention in generating colored characters.
Figure 4:
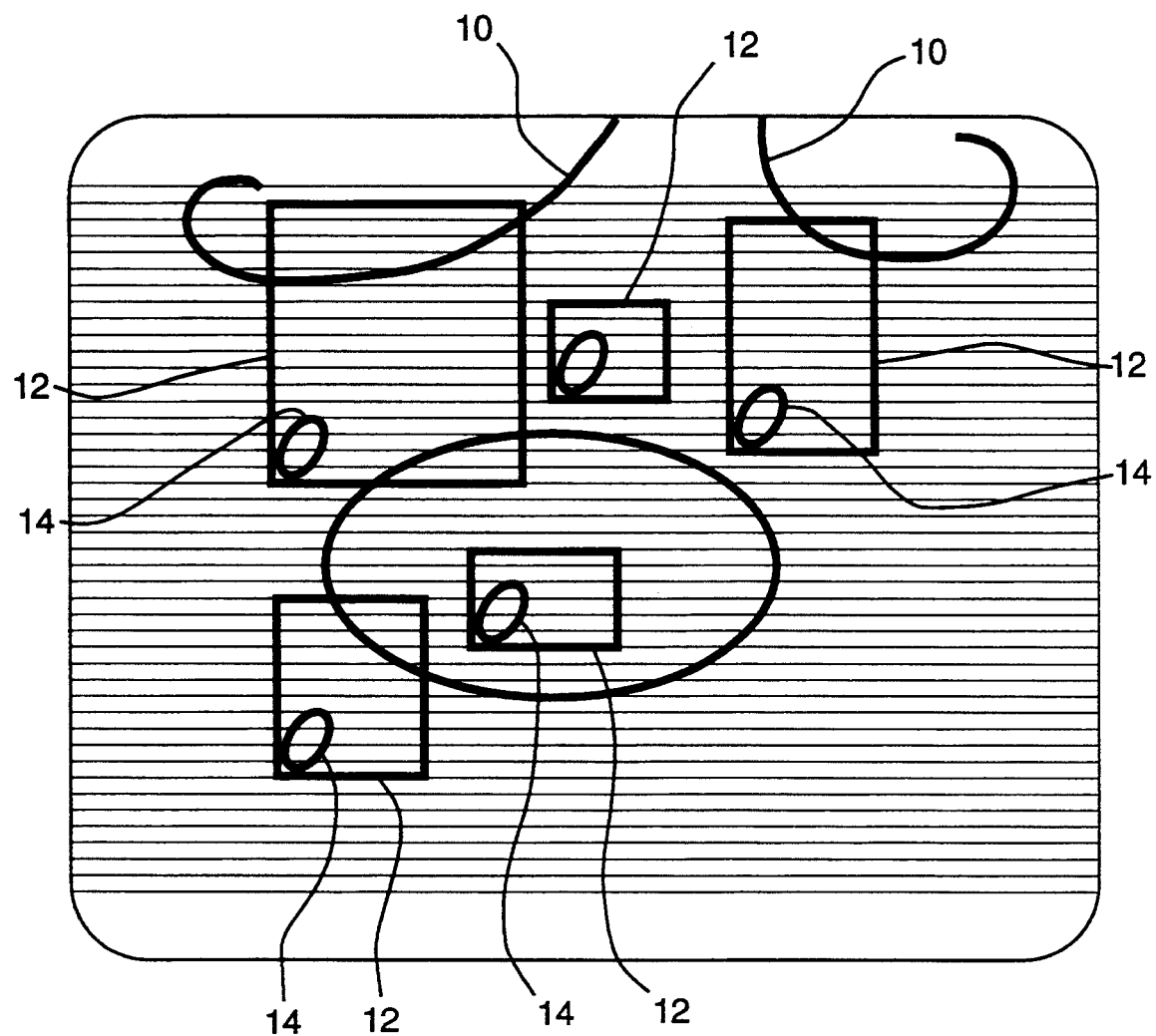

Referring now more particularly to FIGS. 3 and 4, the present invention expands the limited approach of the prior art video, colorized character generator to five degrees of freedom:

(1) The curve 10 away from which the color gradient radiates can be any two dimensional curvilinear function f(x, y). The term "gradient" is used herein to refer to the colorization function, which will be explained in greater detail further in this specification. The curve 10 need not be restricted to a straight line, and especially not to a straight line parallel/perpendicular to the display's scan lines. The only constraint is that the rate of change of the function not be of such high frequency as to be aliased by the pixel sample rate.

(2) The tile 12, i.e. a hypothetical rectangular area containing the generated character(s), can be positioned arbitrarily with respect to the curve 10. The tile 12 need not be entirely on one side of the curve 10. Instead, the tile can be inside, outside, or straddling the curve.

(3) The distance d from the source curve 10 can include any function d(f(x,y)), where x and y are pixel coordinates, that would be visually perceived as radiating away from the source curve. This function d(f(x,y)) can be not only normal, i.e. perpendicular to tangent, but also radial, i.e. concentric, confocal, or coneccentric, to name only a few distance functions which would create pleasing visual effects.

(4) The gradient can be an arbitrary function of distance. It need not be restricted to a linear "step" function of distance. Again, the only constraint is that the rate of change of the function not be of such high frequency as to be aliased by the pixel sample rate.

(5) The final coloration can be a composite (i.e. additive or layered) of multiple such gradients away from multiple such curves.

The appearance on the display of the degrees of freedom numbered 1, 3, and 4 above is shown in FIG. 3 where multiple tiles 12 are colored with respect to a curve 10. The display appearance of the degrees of freedom numbered 2 and 5 above are shown in FIG. 4.

Note also each character tile 12 either can be registered in a unique gradient, or can be registered appropriately in a gradient used in common with other characters. For example, the former might be useful to place a spot highlight 14 on each character as though illuminated from above, whereas the latter might be useful to wash a whole block of text with a single rainbow of color.

Expressed in algebraic-geometric terms, the coloration of the target is given as follows:

$$\chi_{targ} = \lambda_{src} \times \sum_{\substack{i=1 \\ \text{constituent} = \\ R,G,B,K \text{ OR } = \\ H,S,L,K}}^{\text{\# of curves}} \oplus \text{color}_{i,constituent} (\text{distance}((x_{targ}, y_{targ}), f_i(x,y))) \qquad (2)$$

where $\chi_{targ}$ is the color of the target, $\lambda_{src}$ is the luminance of the source, the summation/layering is with respect to a plurality of different curves for each of the primary color planes for R, G, B and the transparency factor (K). The right side of the equation (2) expresses that for each of these planes for R, G, B, and K, as will be explained in greater detail further in this specification, there is a different "color" (actually a luminance) function which is dependent on the distance, as computed by an arbitrary distance function, of the target pixel from the source curve.

As will be explained in greater detail further in this specification, the present implementation realizes several colorization functions of interest based on four different kinds of distance functions—normal, radial, confocal and coneccentric—from members of the conic section family of curvilinear functions. Point shaped curves are associated with radial distance. Line and circle shared curves are associated with normal distance. Parabola shaped curves are associated with coneccentric distance. Ellipse and hyperbola shaped curves are associated with confocal distance. Thus there are two very different types of interrelated functions which must be considered and, preferably, selected by the system's operator. A source curve must be defined (or selected from stored source curve data) and a colorization function as a function of the distance function must be defined (or selected from stored data).

With respect to the selection of the source curves, conic sections, as curvilinear shapes, offer a number of useful properties:

(1) They are the physically correct representation of the image that a point/scooped light source would cast on a planar surface.

(2) They all belong to the class of second degree equations, i.e., equations of the form:

$$Ax^2 + Bxy + Cy^2 + Dx + Ey + F = 0 \qquad (3)$$

Thus, all computations involve primarily multiplications, with some divisions and occasional square roots.

(3) The entire family of conic sections can be specified with at most three pieces of information, two points, and an eccentricity, thus allowing for a simple, flexible user interface. A circle has two coincident foci, an ellipse and a hyperbola two non-coincident foci, and a parabola one focus and a second "pseudo focus" which is the point on the axis of symmetry through which the directerix passes. In fact, all conic sections can be constructed from a single point and a directerix, from which the general notion of eccentricity is derived. Indeed, eccentricity is a highly user-friendly parameter to accept as input, as it allows the user directly to shape the curve of interest, and from it, a defining distance can be directly computed.

Figure 5:
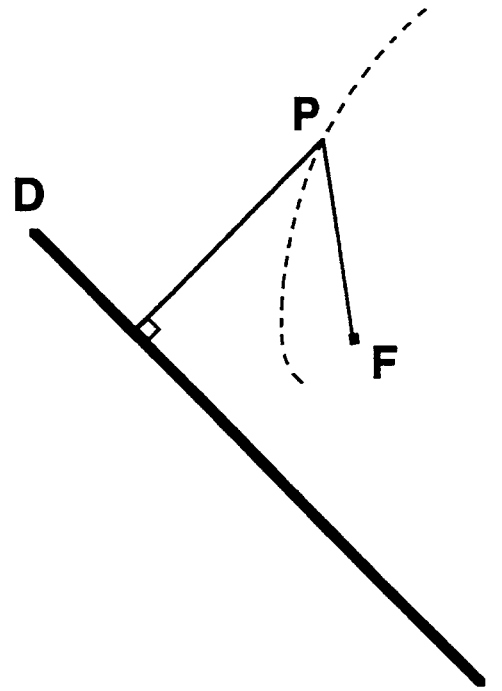
FIG. 5 is a diagram for use in explaining the operation of a preferred embodiment of the invention in defining the color of the generated character as a function of the distance from a curve.

In FIG. 5, the curve is traced at point P such that the eccentricity e, given by $$e = \frac{PF}{PD} \qquad (4)$$

is held constant. In the limiting case lim: e→0, P traces a circle. In the case where 0<e<1, P traces an ellipse. When e=1, P traces a parabola. In the case where e>1, P traces a hyperbola.

In short, conic sections are simple and relatively fast to compute, and an appropriate natural shape for the image of a light source cast upon a planar surface.

The distance function, when applied to a source curve, generates a family of curves which are coaxial with the given curve and on one of which the target pixel is located. The distance is calculated from the given curve to the curve on which the target pixel is positioned.

Four families of colorization functions, taken as an aggregate, provide most of the "looks" that are of immediate commercial interest. Radiosity colorization functions simulate the natural rate of decay of intensity as a function of distance from a light source's image. Trapezoidal (including square and sawtooth) and sinusoidal colorization functions construct periodic effects including crisp and fuzzy color bars respectively. Gaussian colorization functions can be used to construct, among others, a true rainbow, i.e., a natural prismatic diffraction colorization.

Figure 6:
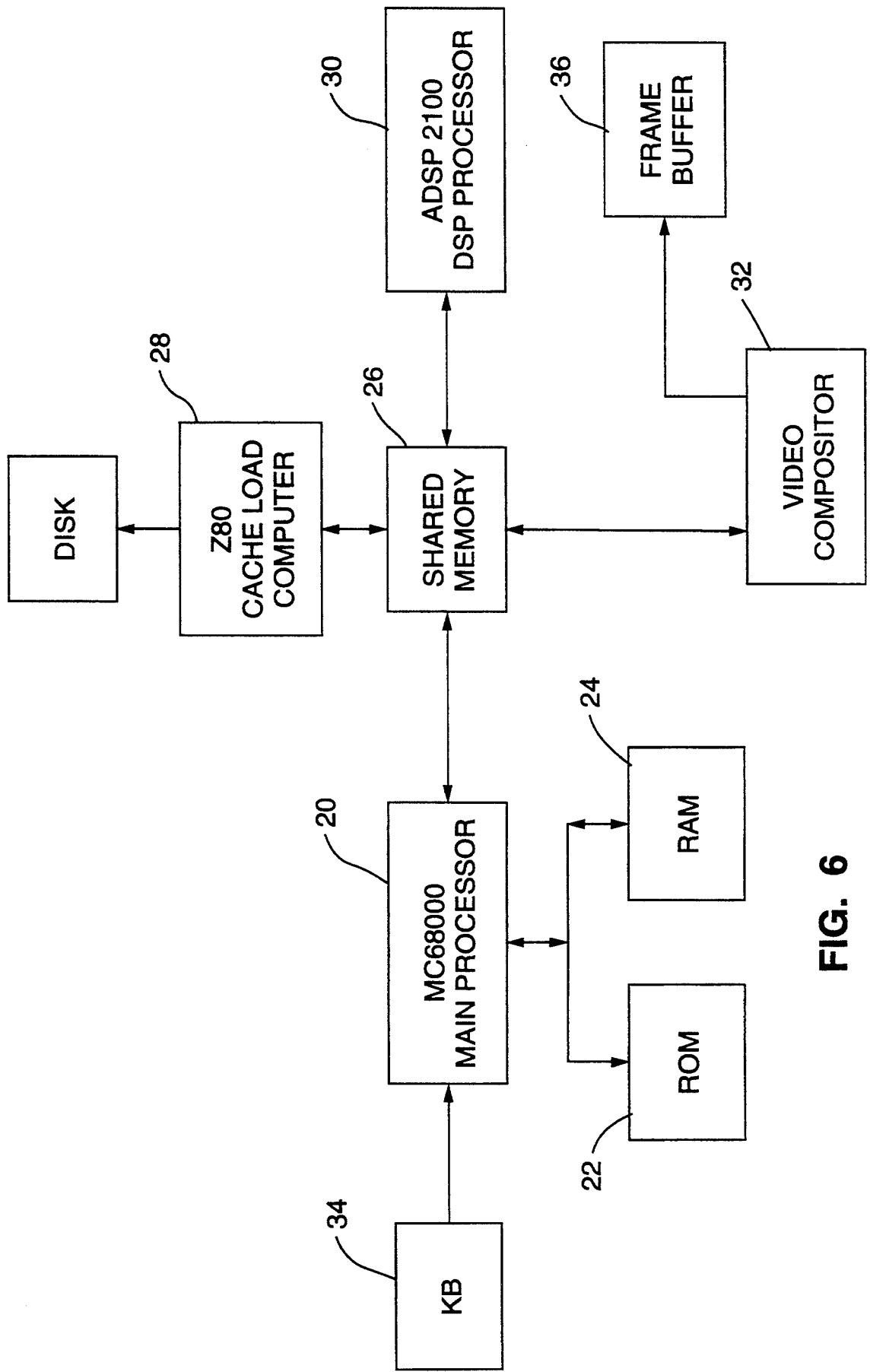
FIG. 6 is a block diagram of a preferred embodiment of the invention.

Referring now to FIG. 6, the preferred embodiment of the invention is shown in block form. It should be understood that the present invention is implemented by means of a model A72 Character Generator made by Abekas Video Systems, Inc., of Redwood City, Calif., which is depicted in block form in FIG. 6.

A main processor 20 is connected to a shared memory 26, a read only memory (ROM) 22, a random access memory (RAM), and a keyboard 34. The shared memory 26 is connected to a cache load computer 28, a digital signal processor 30 and a video compositor 32. The user interacts primarily with the main processor 20. A request for a character to be displayed is sent by the user by pressing one or more keyboard keys (not shown). The user can also specify the type and specific shape of the given curve, the distance function from the given curve, and the colorization function for each of the primary colors as a function of the distance function. This can be done either by data input from the keyboard or by data stored in the RAM 24. The state of the system is known to the main processor 20, which adds the current list of character attributes read from RAM 24 to a rendering request packet. This packet is sent to the shared memory 26.

The cache load computer, a model Z80, loads a "glyph," which is an antialiased character shape read from the RAM 24, into the shared memory 26, assuming the character has not been previously rendered. The glyph is processed by the digital signal processor 30 into four different "planes," i.e. one for each primary color red (R), green (G) and blue (B), as well as a transparency value (K). Each of the planes is colorized in accordance with the function sets specified by the user and is stored in the shared memory 26. The parameters controlling the colorization are those passed by the main processor 20.

The video compositor includes a "stuffer" function which takes the colorized character planes from the shared memory and stores them in a video output frame buffer 36.

The overall strategy is for the main processor 20 to compute all of the major invariants in the problem, so as (1) to simplify the interface with the digital signal processor 30 as well as (2) to minimize the elapsed time in which color gradients are rendered. The digital signal processor 30 then uses these invariants to compute, for each pixel at given coordinates (x,y), whether it is inside (distance at $(x,y)<0$), on (distance at $(x,y)=0$) or outside (distance at $(x,y)>0$) the figure, and the distance of the pixel from the curve, where each type of curve is associated with a particular type of distance-line and circle with normal, point with radial, ellipse and hyperbola with confocal, parabola with coneccentric.

Color is then constructed as a function of this distance. For the most flexible variability, a separate set of parameters is associated with each color plane (R, G, B) and the transparency plane (K).

The main processor 20 has many options with regard to the user interface that it offers to operators. Clearly the most flexible, but least useful, is to allow users directly to manipulate all attributes associated with specification of conic section functions and gradient functions. Of greater commercial value is the packaging of "looks," e.g. the metallic look, the rainbow look, the glassy look, etc., wherein the user manipulates the characterization of the look and the main processor 20 transforms this into the parametric and invariant information required by the digital signal processor 30. The necessary data to produce the selection of "looks" is stored in the RAM 24.

Figure 7:
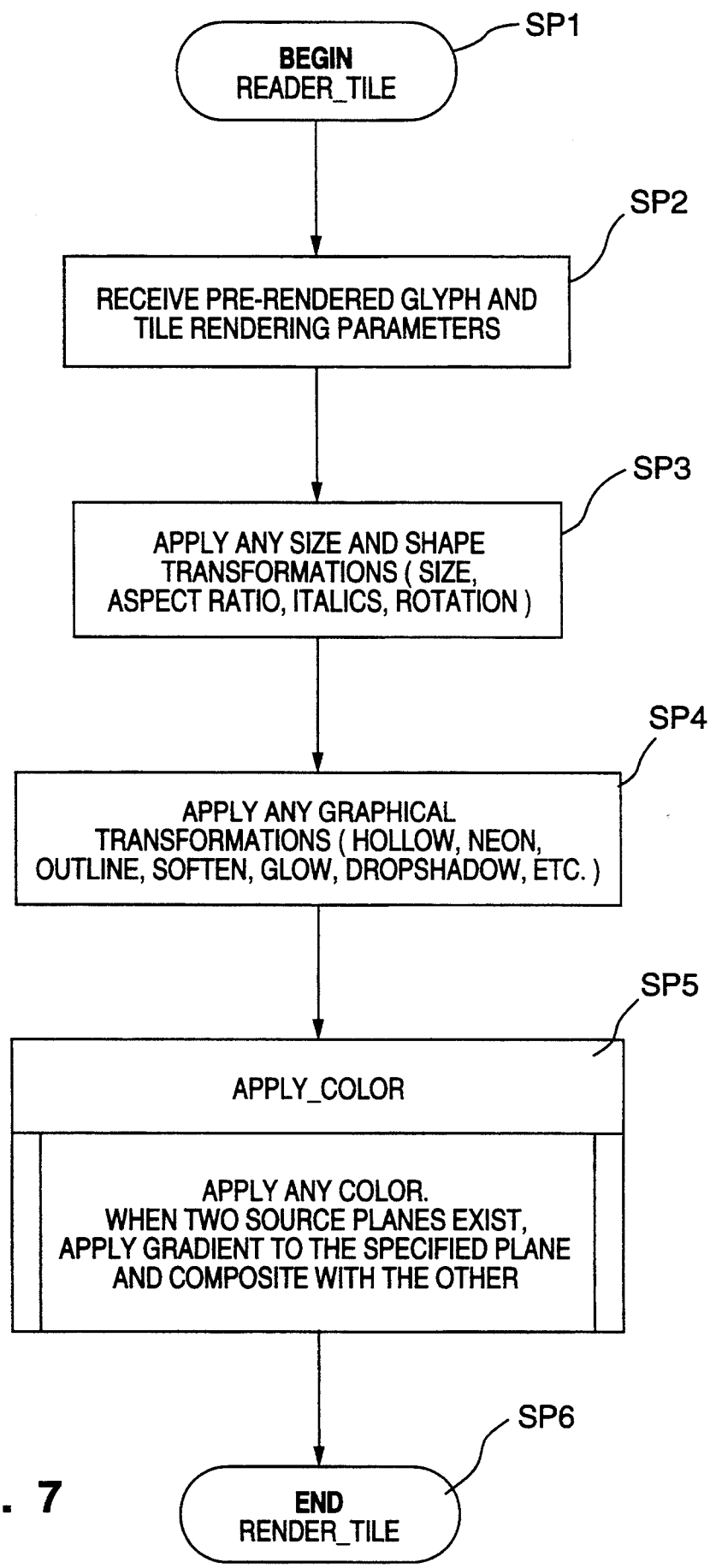
FIG. 7 is an overall flow chart of the steps followed by the preferred embodiment of the invention in generating colored characters.

Referring now more particularly to FIG. 7, an overall flow chart is shown for the steps followed by the DSP 30 in calculating the color for a selected character. At step SP1, the process begins by calling upon the main processor 20 to read through the cache load computer 28 character defining data in the form of a prerendered glyph and the tile rendering parameters from the shared memory 26. The term "tile" refers to a rectangular display area containing a character. The DSP 30 receives the glyph and the tile rendering parameters at step SP2 and applies size and shape transformations (size, aspect ratio, italics, rotation) in conventional fashion. At step SP4, the DSP 30 applies any graphical transformations (hollow, neon, outline, softening, glow, dropshadow, etc.) using conventional techniques.

The color is applied at the next step, SP5, to the pixels of the glyph. When two source planes exist, the color is applied to the specified plane and is composited with the other source plane. At step SP6 the colorized tile is rendered.

Figure 8:
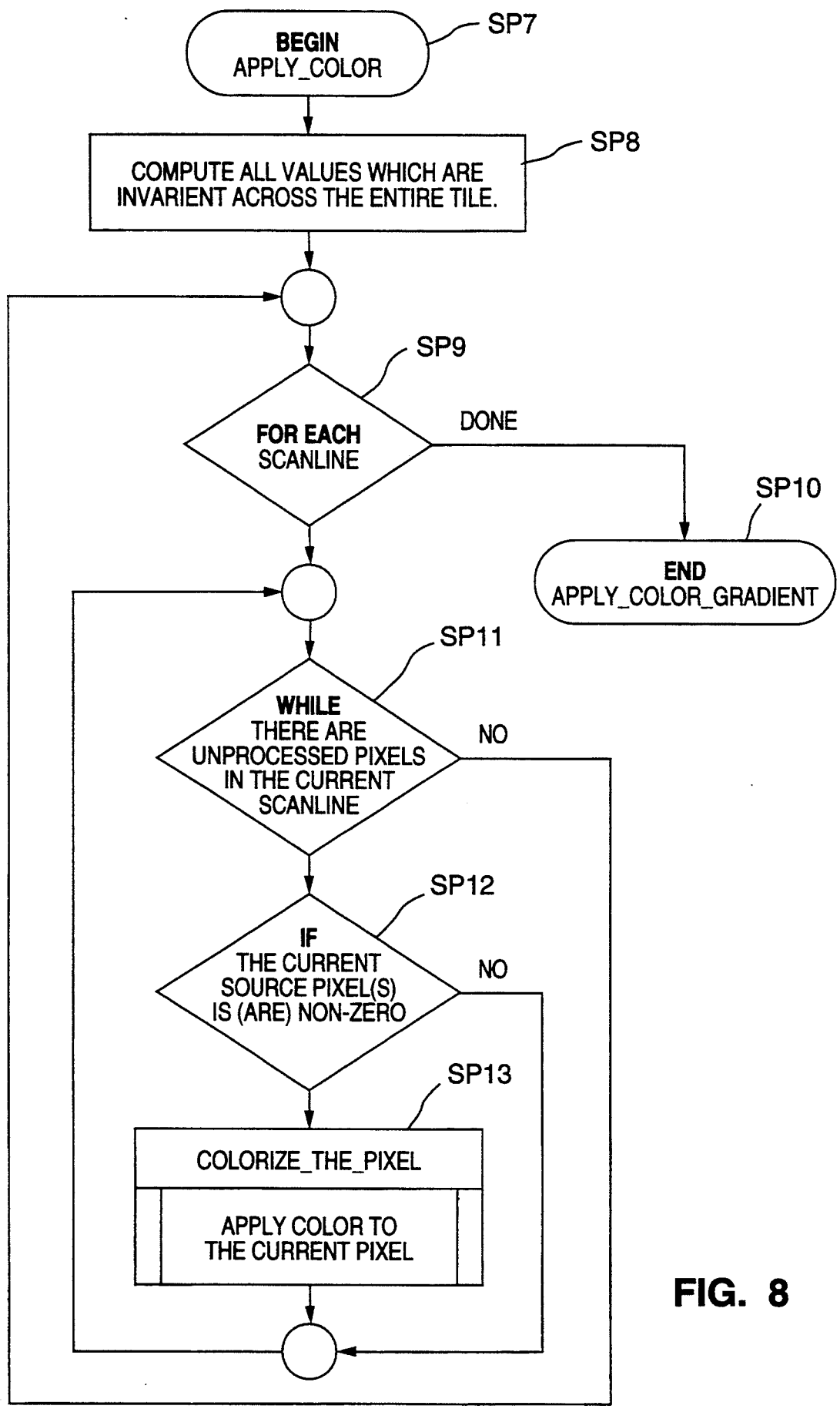
FIG. 8 is a flow chart of the step of applying a color gradient in the flow chart of FIG. 7.

Referring now more particularly to FIG. 8, the step SP5 will be explained in further detail. The routine of applying the color begins at step SP7. At step SP8, the DSP 30 computes all values which are invariant across the entire tile. At step SP9, the DSP determines if there are any scan lines left which are necessary to display the character (or characters) selected by the user. If there are no more scan lines, the routine is ended at step SP10.

If the determination at step SP9 is that there are remaining scan lines for which the process of step SP5 has not been performed, the routine moves to step SP11 where the DSP 30 determines if there are unprocessed pixels in the current scanline. If the determination is no, the routine returns to step SP9. If the answer is yes, the routine progresses to step SP12.

At step SP12, if the current source pixel is non-zero, i.e. it has some luminance value, and thus is to be targeted for some color value, the routine progresses to step SP13 wherein the target pixel is colorized. At the conclusion of step SP13, or if the determination at step SP12 is in the negative, the routine returns to step SP11.

Figure 9:
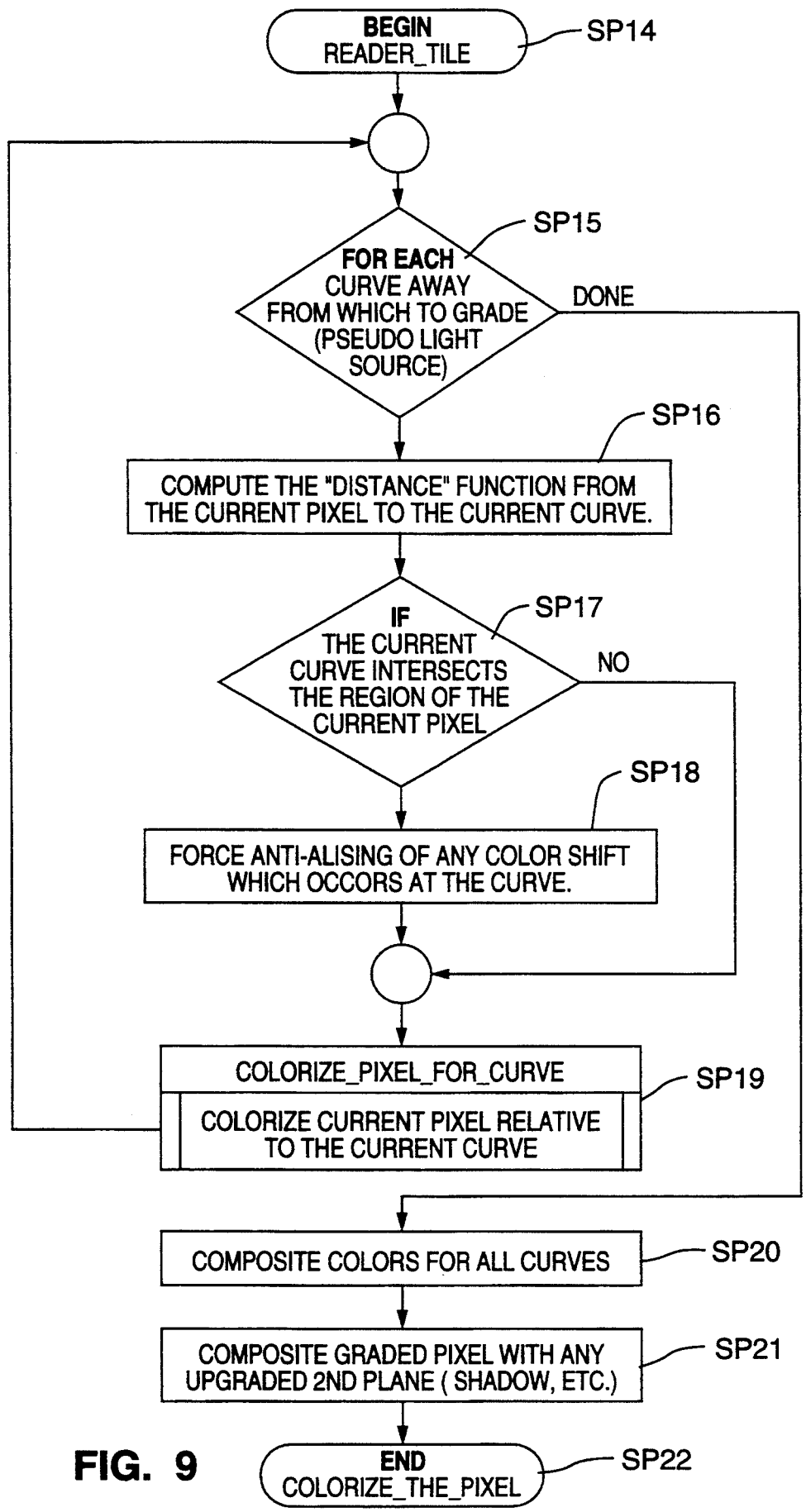
FIG. 9 is a flow chart of the step of colorizing a pixel in the flow chart of FIG. 8.

Referring now more particularly to FIG. 9, the routine of step SP13 is shown in more detail. After the begin step SP14, the DSP 30 determines how many given curves have been specified by the user and for each such given curve proceeds to step SP16. If the processing has been completed for all given curves, the DSP 30 skips to step SP20.

At step SP16 the DSP 30 computes the value of the distance function associated with the type (shape) of the current source curve, as will be explained in greater detail further in this specification, and which is computed from the current pixel to the current curve. At the next step, SP17, the DSP 30 determines whether or not a current curve intersects the region of the current pixel. If the answer is no, the routine skips to step SP19. If the answer is yes, the routine progresses to step SP18.

At step SP18 the DSP 30 forces anti-aliasing of any color shift which occurs at the curve so as to cause the curve to be displayed so as visually to appear to have a smooth shape. This anti-aliasing process will be described in greater detail further in this specification. At the next step SP19, the current pixel is colorized relative to the current curve and the process returns to step SP15.

Once the process steps SP15–SP19, inclusive, have been completed for all user defined curves, a composite for all colors for all curves is generated at step SP20. The colorized pixel is composited with any uncolorized second plane, e.g. shadows, etc., at step SP21. The routine is ended at step SP22.

Figure 10:
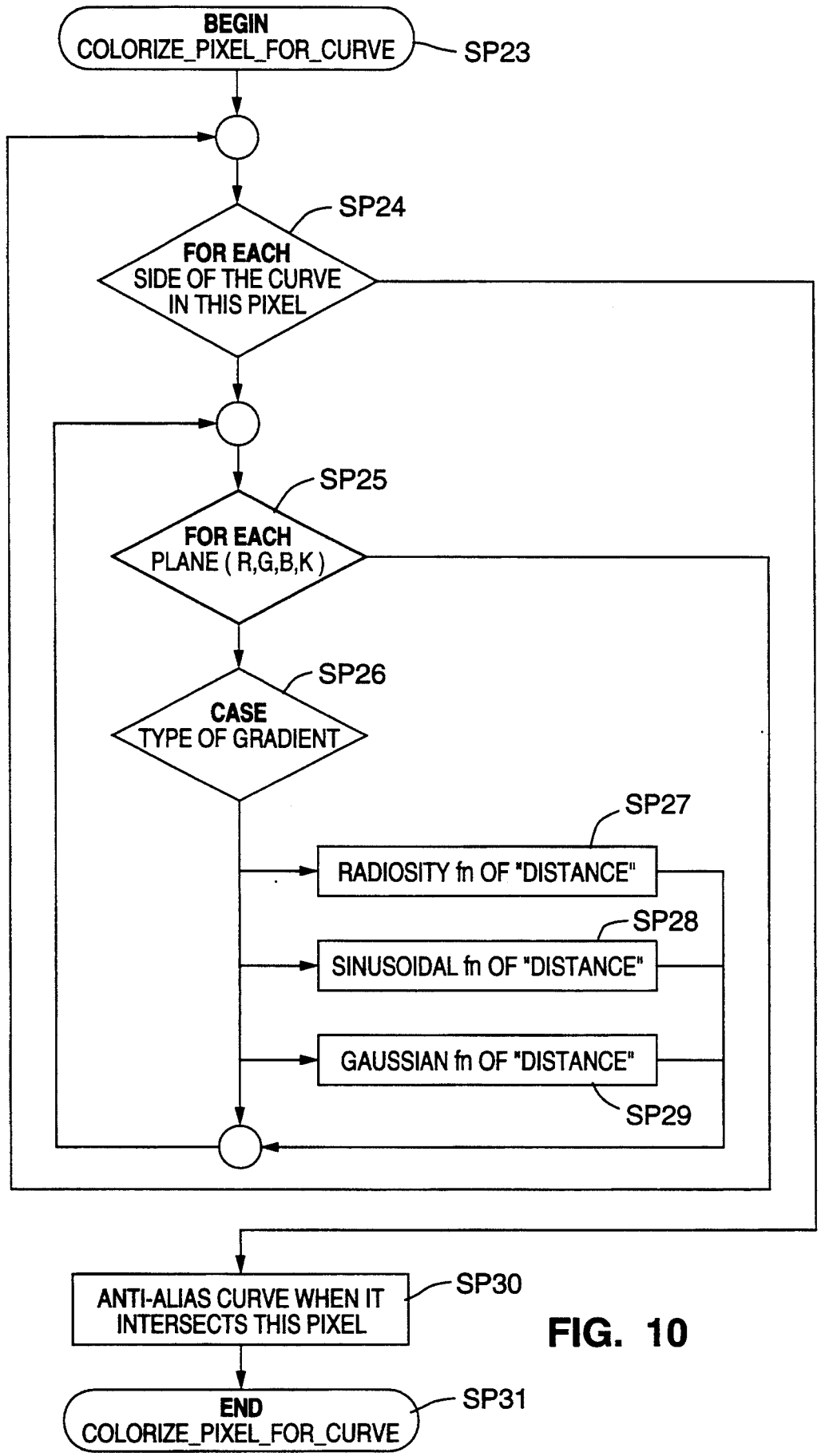
FIG. 10 is a flow chart of the step of colorizing a pixel for a curve in the flow chart of FIG. 9.

The routine of step SP19 for colorizing the pixel for a curve is illustrated in FIG. 10 and begins at step SP23. At the next step SP24, the DSP 30 determines if the remaining process steps SP25–SP26, inclusive, and SP27, SP28 or SP29 have been completed, and if so, moves to step SP30. If not, the DSP 30 proceeds to step SP25 where the DSP 30 determines, for each one of the memory planes for the primary colors (R, G, B) and the transparency factor (K), whether the steps SP26 and SP27, SP28 or SP29 have been completed. If the answer for a particular plane is no, the DSP 30 proceeds to step SP26. If the answer is in the affirmative for all of the R, G, B and K planes, the DSP 30 returns to step SP24.

In step SP26, the DSP 30 determines if the colorization function selected by the user is a radiosity function, sinusoidal function, or Gaussian function of the distance computed by the distance function in step SP16 of FIG. 9 and computes the colorization for the pixel using the selected one of these functions in steps SP27, SP28 or SP29, respectively. Thereafter the DSP 30 returns to step SP25 to continue the processing for the remaining R, G, B, or K planes.

After the process steps SP24–SP26 have been completed for all of the R, G, B, and K planes for each side of the curve in the current pixel, the DSP 30 proceeds to step SP30 where the DSP 30 determines if the curve intersects the current pixel. As will be described in greater detail further in this specification, if such an intersection takes place, the curve is anti-aliased. The routine is ended at step SP31.

As mentioned above, the user can select the curve from which the distance function is to be computed and it has been found that there are a number of advantages, mentioned above, in selecting a conic section as the curve. User specification of the shape of a conic section look is relatively straightforward, since at most three pieces of information are required to express all conic sections, including their degenerate cases.

COMPUTING THE DISTANCE FROM THE CURVE

As mentioned above, at step SP16 the DSP 30 computes the "distance" function from the current pixel to the current curve. This distance function thus depends on the type of current curve which is specified and is computed in the manner now to be explained for each of the various conic sections noted below.

POINTS—A point is a degenerate ellipse with coincident foci, hence $e=0$, and with $a=b=c=0$. Thus it is sufficient for the user to drop a single point $(x_0,y_0)$, with no eccentricity specified, for the main processor 20 trivially to derive the other focus, $(x_1,y_1)=(x_0,y_0)$ and the defining distance $d_{defining}$ of 0 to pass to the digital signal processor 30.

The digital signal processor 30 then computes normal distance for each point (x,y) on the surface of the tile as it does for confocal distance from an ellipse by $$d_{(x,y)} = \frac{\sqrt{(x-x_0)^2 + (y-y_0)^2} + \sqrt{(x-x_1)^2 + (y-y_1)^2}}{2} - d_{defining} \quad (5)$$

LINES—A line is the extension of a degenerate ellipse through distinct foci with $e=1$. In this case, it is sufficient for the user to drop two points, reserving the case where the user specifies eccentricity=1 for the confocal elliptical gradient about the line segment specified by the two points. In the case of lines, rather, it is fastest for the digital signal processor 30 to process them in normal form. Thus the main processor 20 must derive $\alpha$ the angle of inclination of the line, given by $$\alpha = \arctan\left(\frac{y_1 - y_0}{x_1 - x_0}\right) \quad (6)$$

as well as p, the perpendicular distance of the line from the origin, given by $$p = x_1\cos\left(\alpha + \frac{\pi}{2}\right) + y_1\sin\left(\alpha + \frac{\pi}{2}\right) \quad (7)$$

The main processor 20 then passes $\sin(\alpha+\pi/2)$, $\cos(\alpha+\pi/2)$, and $d_{defining}=p$ to the digital signal processor 30.

The digital signal processor 30 then computes the normal distance for each point (x,y) on the surface of the tile by $$d_{(x,y)} = x\cos\left(\alpha + \frac{\pi}{2}\right) + y\sin\left(\alpha + \frac{\pi}{2}\right) - d_{defining} \quad (8)$$

This distance will be signed. Although in general, the sign is interpreted to distinguish inside from outside, in the case of lines it merely distinguishes one side of the line from the other.

CIRCLES—A circle is a degenerate ellipse characterized by $$e=0 \text{ AND } a=b=r \text{ AND } c=0 \quad (9)$$

Thus, once the user has specified a center and eccentricity 0, the second point may be interpreted as establishing the radius of the circle, computed by $$r = \sqrt{(x_1 - x_0)^2 + (y_1 - y_0)^2} \quad (10)$$

The center is passed to the digital signal processor 30 as two coincident foci $(x_1,y_1)=(x_0,y_0)$, and the defining distance is given by $d_{defining}=r$.

The digital signal processor 30 then computes normal distance for each point (x,y) on the surface of the tile as it does for confocal distance from an ellipse as given in Equation 5 above.

PARABOLAS—A parabola, like a line, is a conic section with $e=1$. However, the second point which the user drops, rather than defining the second focus of an ellipse, defines the directerix, a normal to the line connecting the two points and intersecting that connecting line at the second point. Hence, the main processor 20 must pass both the characterization of the normal line and the point $(x_0,y_0)$ which is the focus of the parabola. To characterize the normal, the main processor 20 must compute $\alpha$, the angle of inclination of the normal to the directerix, i.e. the angle of inclination of the line connecting the two user specified points, as given in Equation 6 above. The defining distance of this line to the origin, $d_{defining}=p$, is then given by $$p=x_1\cos(\alpha)+y_1\sin(\alpha) \quad (11)$$

which is passed to the digital signal processor 30 along with $\sin\alpha$ and $\cos\alpha$.

The digital signal processor 30 then computes, for each point (x,y) on the surface of the tile, a true coneccentric distance which is the difference between the distance from the point to the directerix and the point to the focus—when this difference is 0, the point is on the parabola, when less than 0, the point is inside, and when greater than 0, the point is outside. This coneccentric distance is given by $$d_{(x,y)} = \quad (12)$$

-continued $$(x\cos\alpha + y\sin\alpha - d_{defining}) - (\sqrt{(x-x_0)^2 + (y-y_0)^2})$$

ELLIPSES—A non-degenerate ellipse is a conic section with distinct foci and eccentricity such that $0 < e < 1$, simple information for the user directly to specify. Since c is given by $$c = \frac{\sqrt{(x_1 - x_0)^2 + (y_1 - y_0)^2}}{2} \qquad (13)$$

the defining distance, $d_{defining} = 2a$ is given by $$2a = 2\left(\frac{e}{c}\right) \qquad (14)$$

The digital signal processor 30 then computes, for each point (x,y) on the surface of the tile, the confocal distance as given by Equation 5 above.

HYPERBOLAS—A hyperbola is a conic section with distinct foci and eccentricity such that $e > 1$, again, as with the ellipse, simple information for the user directly to specify. Although the digital signal processor 30 uses the information somewhat differently, still, the defining distance, 2a, is computed as given by equation 14 above.

The hyperbola is also an unusual case in that the user may choose whether to have one interior region, or two. When the user selects one interior region, the digital signal processor 30 then computes, for each point (x,y) on the surface of the tile, the confocal distance as given by $$d_{(x,y)} = -\left(\frac{\sqrt{(x-x_0)^2 + (y-y_0)^2} - \sqrt{(x-x_1)^2 + (y-y_1)^2}}{2} - d_{defining}\right) \qquad (15)$$

When the user selects two (opposing) interior regions, the confocal distance is given by $$d_{(x,y)} = -\left(\frac{abs\sqrt{(x-x_0)^2 + (y-y_0)^2} - \sqrt{(x-x_1)^2 + (y-y_1)^2}}{2} - d_{defining}\right) \qquad (16)$$

Computing Coloration

The coloration $x_{(x,y)}$ at any point (x,y) on the surface of the tile is the composition of luminance values computed for each of the Red (R), Green (G), Blue (B), and Key, i.e. transparency (K) planes. That is $$X_{(x,y)} = \bigoplus_{\substack{constituent = \\ R,G,B,K}} \lambda_{(x,y,constituent)} \qquad (17)$$

The luminance values for each plane $\lambda_{constituent}$, hereafter $\lambda_{targ}$, are computed using independent colorization functions, i.e. for each $\lambda_{targ}$ given by $$\lambda_{targ} = color(distance((x,y),f(x,y))) \times \lambda_{src} \qquad (18)$$

the color function can be entirely different for each of the four planes. Only minor changes of parameters on otherwise similar gradients, e.g. phase offsets in Gaussian gradients to produce a rainbow, are often all that is needed to be useful. However, even such minor phase shifts in combination with a radiosity gradient in the Key plane can give the impression of a rainbow cast on a glassy surface.

Of course, the problem is not entirely this simple. Although the luminance values in each plane are allowed to vary such that $0 \leq \lambda_{targ} \leq 255$, the $\lambda_{targ}$ values at any given position on the surface of the tile must be further constrained to preserve anti-aliasing information at character edges. That is, $\lambda_{targ}$ is further constrained such that $0 \leq \lambda_{targ} \leq \lambda_{src}$. Given Equation 18, this constraint is satisfied by any colorization function such that $0 \leq color(x) \leq 1$. For purposes of computational accuracy, this turns out to be inconvenient; however, post-computation, the colorization function range is normalized so as to satisfy this constraint.

It is also the case that, since the tile may be placed arbitrarily with respect to the source curvilinear function, it is entirely possible that the curve crosses the tile surface, and that differential coloration on either side of the curve will need to be anti-aliased so as to give the appearance of a smooth curve crossing the tile surface. This is accomplished with a simple low-pass digital over-sampling filter, averaging the coloration associated with subpixel positions within those pixels within a distance of 1 pixel of the curve boundary. Once anti-aliased for a given curve, the computed values can be composited with those computed relative to other curves.

As denoted in steps SP27, SP28 and SP29 of FIG. 10, there are three basic colorization functions which are employed in the preferred embodiment, although it is to be understood that other colorization functions could be employed in other embodiments. These are radiosity, sinusoidal, and Gaussian functions of the distance computed, $d_{(x,y)}$ or just d, using one of the distance functions described above.

RADIOSITY function—The classic radiosity function expresses illumination (energy per square unit of measure) as $$\lambda_{targ} = \frac{1}{(d+1)^2} \times \lambda_{src} \qquad (19)$$

This is generalized by allowing the main processor 20 to specify five coefficients, A, B, C, D, and E such that $$\lambda_{targ} = \left(A\left(\frac{1}{(d+1)^2}\right) + \qquad (20)\right.$$

$$B\left(\frac{1}{(d+1)}\right) + C + D(d+1) + \frac{(d+1)^2}{E}\right) \times \lambda_{src}$$

There are few cases of interest here worth pointing out. When A=B=D=E=0, the resultant gradient is a flat color. When A=B=E=0, the resultant gradient paints the color characterized by C at the curve boundary and grades linearly towards the color characterized by C+D. When C=0, the gradient may grade through black. When C=D=E=0, the gradient will grade to black. When A=B=C=0, the gradient will grade from black. Finally, of course, when B=C=D=E=0, the gradient will be a classic radiosity decay of the color characterized by A.

TRAPEZOIDAL function—There are three sets of considerations applicable to trapezoidal functions; those associated with the range of variance, those associated with clipping, and those associated with period.

The limits of the range of variance is expressed as an ordered pair of percentages (ll%,ul%) such that $0\% \leq ll\% \leq ul\% \leq 100\%$. $\lambda_{targ}$ is then clipped such that $ll\%(\lambda_{src}) \leq \lambda_{targ} \leq ul\%(\lambda_{src})$.

The interval of function outputs that is to be clipped is expressed as a percentage, clip, symmetrical about the local minima/maxima, to be forced to $ll\%(\lambda_{src})/ul\%(\lambda_{src})$ respectively. It should be noted that when clip is 0, then the function is triangular, and when clip is 0.5, then the function is square.

With the above having been specified, the period p of the function then determines not only the absolute lengths of the intervals that are forced to the clipping limits but also the (complementary) slopes of the intervals between the minima/maxima.

To make the function absolutely specified, the only additional piece of information required is an offset, $d_o$ to d which indicates effectively where in the period of the first duty cycle to start processing.

Thus, given period p, distance-to-curve d and offset $d_o$, percentage of duty cycle exhausted at any point (x,y) on the surface of the tile, $d_{(x,y)\%}$, is given by $$d_{(x,y)\%} = \frac{(d_{(x,y)} - d_0) \text{ rem } p}{p} \quad (21)$$

From this, $\lambda_{targ}$ is given by

IF $d_{(x,y)\%} \leq clip$ (22)
THEN $ul\% (\lambda_{src})$
IF $clip < d_{(x,y)\%} < .5$
THEN $$ul\% (\lambda_{src}) - \left[\left[\left(\frac{ul\% - ll\%}{.5 - clip}\right)(d_{(x,y)\%} - clip)\right]_\% (\lambda_{src})\right]$$

$\lambda_{targ}$ = IF $.5 \leq d_{(x,y)\%} \leq (.5 + clip)$
THEN $ll\%(\lambda_{src})$
IF $(.5 + clip) < d_{(x,y)\%}$
THEN $$ll\%(\lambda_{src})) + \left[\left[\left(\frac{ul\% - ll\%}{.5 - clip}\right)(1 - d_{(x,y)\%})\right]_\% (\lambda_{src})\right]$$

It should be noted that these are all fast computations, since if p is passed as its reciprocal $p_{reciprocal}$, then $d\% = \text{frac}(dp_{reciprocal})$, a two-cycle computation.

SINUSOIDAL function—Since the DSP 30 performs multiplications in a single cycle, a moderately generalized case of sinusoidal variation can be provided for little more overhead than that of the simple case of variation with sin(d). With input period p and offset $d_o$ and coefficients A, B, C, D, and E, color in a given plane can then vary as follows:

$$\lambda_{targ} = \left(\begin{array}{c} A\sin^2(dp + d_0) + B\sin(dp + d_0) + C + \\ D\frac{1}{\sin(dp + d_0)} + E\frac{1}{\sin^2(dp + d_0)} \end{array}\right) \times \lambda_{src} \quad (23)$$

GAUSSIAN function—Similarly to sinusoidal functions, a modestly generalized case of Gaussian variation can be provided for little more overhead than that of the simple case of variation with sin(d)/d. With an input period p and offset $d_o$ and coefficients A, B, C, D, and E, color in a given plane can then vary as follows:

$$\lambda_{targ} = \quad (24)$$

$$\left(\begin{array}{c} A\left(\frac{\sin(dp + d_0)}{dp + d_0}\right)^2 + B\left(\frac{\sin(dp + d_0)}{dp + d_0}\right) + C + \\ D\left(\frac{dp + d_0}{\sin(dp + d_0)}\right) + E\left(\frac{dp + d_0}{\sin(dp + d_0)}\right)^2 \end{array}\right) \times \lambda_{src}$$

Although the present invention has been shown and described with respect to preferred embodiments, various changes and modifications which are obvious to a person skilled in the art to which the invention pertains are deemed to lie within the spirit and scope of the invention as claimed.

What is claimed is:

1. An apparatus for electronically generating colorized characters for a character display, comprising:
   first memory means for storing character defining data;
   input means for allowing a user to specify one or more characters to be displayed, one or more curves, and one or more colorization functions which specify the colors of a pixel of the video display device at a distance defined by a distance function; and
   processing means for reading the character defining data for the character display and for generating and outputting electronic colorization data for each pixel of the character display by electronically calculating the colorization function as a function of the distance function from said one or more curves.

2. An apparatus as recited in claim 1 wherein the input means allows the user to specify a curve from said one or more curves having the form:

$$Rx^2 + Sxy + Ty^2 + Ux + Vy + W = 0$$

3. An apparatus as recited in claim 1 wherein the input means allows the user to select from among a point, a line, a circle, a parabola, an ellipse or a hyperbola as the curve.

4. An apparatus as recited in claim 1 wherein in the processing means the colorization function is a radiosity function in the form:

$$\lambda_{targ} = \left( A\left(\frac{1}{(d+1)^2}\right) + B\left(\frac{1}{(d+1)}\right) + C + D(d+1) + \frac{(d+1)^2}{E} \right) \times \lambda_{src}$$

where A, B, C, D, and E are user defined constants, d is the distance computed according to the distance function, $\lambda_{targ}$ is the luminance of the target pixel for any given primary color or transparency plane, and $\lambda_{src}$ is the luminance of the source pixel.

5. An apparatus as recited in claim 1 wherein in the processing means the colorization function is a trapezoidal function in the form:

IF $d_{(x,y)}\% \leq clip$
THEN $ul\%$ ($\lambda_{src}$)
IF $clip < d_{(x,y)}\% < .5$
THEN $$ul\% \; (\lambda_{src}) - \left[\left[\left(\frac{ul\% - ll\%}{.5 - clip}\right)(d_{(x,y)}\% - clip)\right]_\% (\lambda_{src})\right]$$

$\lambda_{targ}$ = IF $.5 \leq d_{(x,y)}\% \leq (.5 + clip)$
THEN $ll\%(\lambda_{src})$
IF $(.5 + clip) < d_{(x,y)}\%$
THEN $$ll\%(\lambda_{src})) + \left[\left[\left(\frac{ul\% - ll\%}{.5 - clip}\right)(1 - d_{(x,y)}\%)\right]_\% (\lambda_{src})\right]$$

where $ll\%, ul\%$ express the lower and upper limits, respectively, of the range of variance as an ordered pair of percentages, $\lambda_{targ}$ is the luminance of the target pixel for any given primary color or transparency plane, $\lambda_{src}$ is the luminance of the source pixel, $d_{x,y}\%$ is the percentage of duty cycle exhausted at any point (x,y) on the surface of the tile and is given by:

$$d_{(x,y)}\% = \frac{(d_{(x,y)} - d_0) \; rem \; p}{p}$$

where p is a given period, d is the distance-to-curve and $d_o$ is the offset.

6. An apparatus as recited in claim 1 wherein in the processing means the colorization function is a sinusoidal function defined by:

$$\lambda_{targ} = \begin{pmatrix} A\sin^2(dp + d_0) + B\sin(dp + d_0) + C + \\ D\frac{1}{\sin(dp + d_0)} + E\frac{1}{\sin^2(dp + d_0)} \end{pmatrix} \times \lambda_{src}$$

where A, B, C, D, and E are user defined constants, $\lambda_{targ}$ is the luminance of the target pixel for any given primary color or transparency plane, $\lambda_{src}$ is the luminance of the source pixel, p=the input period, $d_o$ is the offset.

7. An apparatus as recited in claim 1 wherein in the processing means the colorization function is a Gaussian function defined by:

$$\lambda_{targ} =$$

$$\begin{pmatrix} A\left(\frac{\sin(dp + d_0)}{dp + d_0}\right)^2 + B\left(\frac{\sin(dp + d_0)}{dp + d_0}\right) + C + \\ D\left(\frac{dp + d_0}{\sin(dp + d_0)}\right) + E\left(\frac{dp + d_0}{\sin(dp + d_0)}\right)^2 \end{pmatrix} \times \lambda_{src}$$

where A, B, C, D and E are user defined constants, $\lambda_{targ}$ is the luminance of the target pixel for any given primary color or transparency plane, $\lambda_{src}$ is the luminance of the source pixel, p=the input period, $d_o$ is the offset.

8. A method for electronically generating colorized characters for a character display, comprising the steps of:
   electronically storing character defining data,
   electronically inputting data which defines one or more characters to be displayed, one or more curves, and one or more colorization functions which specify the colors of a pixel of a video display device at a distance defined by a distance function;
   reading the character defining data for the character to be displayed;
   generating colorization data for each pixel of a video display of the character corresponding to the character defining data by electronically calculating the colorization function as a function of the distance function from said one or more curves.

* * * * *